Aug. 16, 1938.   V. MULHOLLAND   2,127,087
WEIR FOR GLASS MAKING TANK
Filed Nov. 4, 1935

Witness:
W. B. Thayer.

Inventor;
Vergil Mulholland
By Brown & Parlow
Attorneys

Patented Aug. 16, 1938

2,127,087

UNITED STATES PATENT OFFICE 2,127,087

WEIR FOR GLASS MAKING TANK

Vergil Mulholland, West Hartford, Conn., assignor to Hartford-Empire Company, Hartford, Conn., a corporation of Delaware Application November 4, 1935, Serial No. 48,183

12 Claims. (Cl. 49—54)

This invention relates to a weir for use in a glass making tank and particularly to the construction of such a weir, its relation to the tank and to apparatus for cooling the weir, especially at the joints between the blocks of which it is made.

Any masonry structure such as a weir, which is adapted to be submerged in molten glass at a portion of the glass tank where the glass is at a relatively high temperature, is necessarily subjected to several actions all of which tend to shorten its life.

For example, if there be any joints in or about the weir which lie in substantially horizontal planes or at any large angle to the vertical, glass tends to seep into such joints and to drill upwardly through the blocks above the joints in a manner which will rapidly cause the erosion and corrosion of the portion of the blocks above the joints. This action is in addition to the normal corrosive action of the glass upon the blocks of which the weir and other parts of the tank are made. Also, if glass penetrates the joints sufficiently, the blocks, which often have a lower specific gravity than the glass, tend to float therein, thus ruining the structure. Hence it is desirable that provision be made for keeping the joints relatively cool, so that any glass penetrating thereinto will be frozen and the corrosive action thereof on the blocks contiguous to the joints be stopped. At the same time, it is desired that as little heat as possible be lost or dissipated, so as to minimize the amount of heat required to be supplied to the tank to maintain the glass up to the desired temperature for melting and/or other working.

One of the objects of the present invention, therefore, is to provide a construction for a tank with a weir in such manner that all the joints, which are beneath the surface of the glass, will be disposed in substantially vertical planes, so as to minimize the corrosion of the blocks bordering such joints.

A further object of the invention is to provide for the cooling of the joints in a weir structure in such manner that cooling is applied locally to the joints, while at the same time heat insulation may be applied intermediate the joints, so as to save heat in so far as it is possible.

Further objects of the present invention include specific means by which joints in a submerged masonry structure in a glass tank may be locally cooled.

Further and more detailed objects of the present invention will appear from the following description and appended claims all when taken in connection with the accompanying drawing, in which:

I have chosen to illustrate my invention as applied to a glass making furnace or tank of substantially the same general arrangement as that shown and described in my prior and copending application, Serial No. 730,441, filed June 13, 1934 for Glass making apparatus and method which has become Patent 2,068,925. The present application in so far as it relates to common subject matter is to be considered a continuation in part of said prior application. Inasmuch, however, as the present invention relates solely to the weir, the construction thereof, and its relation to the tank construction, the tank as a whole will be described only generally.

Figure 1:
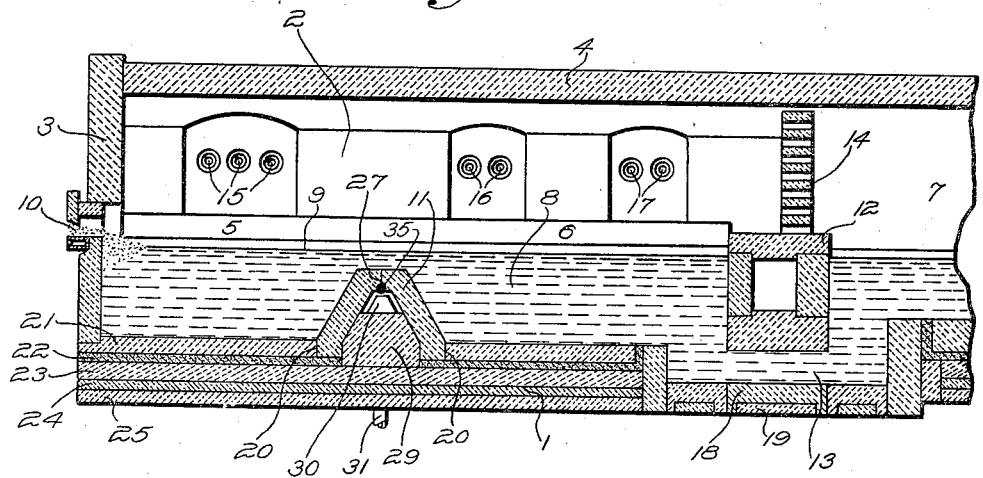
Figure 1 is a view of a portion of a glass melting tank substantially in longitudinal vertical section and showing a weir constructed in accordance with my invention.

Referring to Fig. 1 in the accompanying drawing, I have shown a tank construction including a bottom generally indicated at 1, side walls 2, an end wall 3 and an arched roof 4. The tank is divided to a certain extent at least into a melting chamber 5, a refining chamber 6 and a tempering chamber 7. In these chambers there is adapted to be contained a bath of molten glass generally indicated at 8, which is normally maintained up to a predetermined level 9. Glass making materials may be supplied to the bath in the melting chamber in any suitable or desired manner as indicated generally at 10. The melting and refining chambers are shown divided to some extent at least below the glass level 9 by a weir generally indicated at 11. The refining chamber 6 is separated from the tempering chamber 7 by a bridge wall 12 beneath which glass may pass through one or more submerged throat passages as shown at 13. Above the bridge wall 12 there is illustrated a shadow wall 14 at least partly heat-separating the refining chamber 6 from the tempering chamber 7 above the glass level 9.

Heat may be supplied to the melting and refining chambers by suitable burners using gas or oil as fuel, the burners not being shown in detail, but the burner openings being illustrated at 15 for the melting chamber and at 16 and 17 for the refining chamber. It will be understood that the tank may be provided with heat recovery means as regenerators or recuperators, for example as set forth in my prior copending application above referred to. Inasmuch, however, as the present application relates specifically to the construction and provisions for cooling of the weir, and the relation of the weir to the tank construction, no further description of the tank as a whole will be given.

One of the chief sources of cost in glass making tanks is that due to the heat lost through the walls of the tank, particularly those walls which are in contact with molten glass, for the reason that many, if not all, prior art practices are such that glass-contacting walls had to be kept fairly cool on the outside in order that any glass, which might penetrate the cracks or joints between the blocks of which such walls were made, would freeze in those joints and prevent further penetration of glass thereinto. For this reason much of the commercial art and the patented art has been devoid of any suggestions for the adequate insulation of glass tanks in a way which would permit the saving of a maximum amount of heat, while at the same time retarding or preventing to a substantial extent the penetration of molten glass into the joints between the blocks.

One solution for this difficulty which has been proposed is disclosed in the patent to Willetts, No. 1,996,266, granted April 2, 1935, in which it was suggested that insulation be applied centrally only of each individual block, the joints therebetween being uninsulated. This type of construction is employed in the blocks shown in Fig. 1 at 18, beneath the throat 13. These blocks are what may be termed "panel insulated" by the use of insulation 19, as shown.

Figure 2:
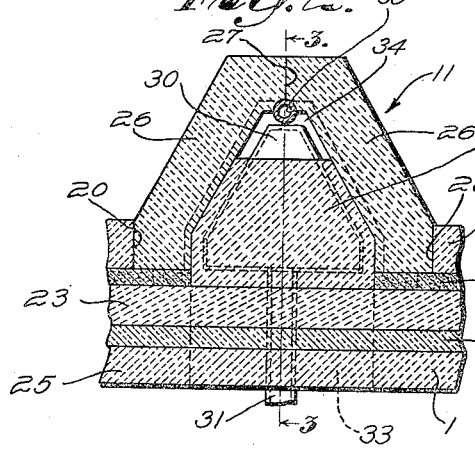
Fig. 2 is a fragmentary view of the weir as shown in Fig. 1 in transverse vertical section and on an enlarged scale, showing the details of construction thereof.

As above stated, one of the objects of the present invention is to provide a weir construction in relation to the tank construction in which all the submerged joints between the blocks will lie in vertical planes. This is accomplished in the present case by having the joints between the blocks forming the weir and those forming the bottom of the tank in vertical planes as shown at 20 (Figs. 1 and 2).

While it is not deemed essential to the practice of my invention, I have illustrated herein a particular type of construction for the bottom 1 of the tank, which is substantially as follows: the interior layer or course of blocks is shown at 21, this layer being of blocks of high refractory material such as "Corhart", which offers good resistance to corrosion by contact with molten glass and which has proven to be quite satisfactory in tank bottom constructions. Outside this there may be a layer 22 of tamped grog mixed with some plastic such as clay, this layer serving to prevent the further penetration of any glass which may penetrate the joints between the blocks of the layer 21. The next layer or course 23 may be of first quality fire brick, this layer being surrounded in succession by a layer 24 of insulating brick and an outer layer 25 also of first quality fire brick.

While I have disclosed a specific construction for the floor or bottom wall of the tank, it will be understood that the invention as hereinafter set forth in the claims is not limited to this specific construction, and this construction is not claimed per se in the present case.

Figure 3:
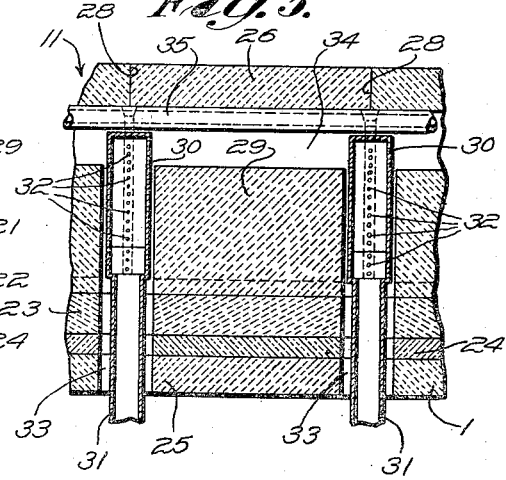
Fig. 3 is a fragmentary view in vertical section of a portion of the weir shown in Figs. 1 and 2 taken substantially on the line 3—3 of Fig. 2.

The weir 11 is constructed of a plurality of blocks as shown at 26 on each side thereof, the blocks being shaped in the peculiar manner illustrated and meeting the blocks forming the upper course 21 of the bottom of the tank in vertical joints 20 and meeting each other in a vertical joint at 27, which latter joint extends longitudinally of the weir. The blocks 26 do not extend completely across the tank in most ordinary constructions, but are contiguous to one another in joints as at 28 (Fig. 3), which lie in vertical planes and extend transversely of the weir. It will be understood that the joints 28 between the blocks 26 on one side of the weir will be respectively opposite and lie in the same planes as the joints between the blocks on the other side of the weir. This construction makes for ease in cooling the joints as will hereinafter appear. Also as shown, the blocks 26 forming the weir rest upon the layer 22 of the bottom (Fig. 2). Thus there are no joints lying in any planes other than substantially vertical planes, these joints being shown at 20, 27 and 28. This is deemed an important feature of the present invention as it makes for minimum wearing of the blocks and maximum life for the construction.

In order to provide the maximum insulation possible for the blocks forming the weir, I preferably provide blocks 29 partially filling the cavity formed between side blocks 26 of the weir intermediate the parallel transverse joints 28 and extending up only part way to the top of the cavity formed by blocks 26 as shown. The blocks 29 preferably are of first quality fire brick, or some other suitable material, and as shown are spaced from all the several joints, any portions of which are in contact with glass. The blocks 29 are shown as resting upon the blocks forming the layer 23 of the bottom of the tank. In this way, I obtain the desirable result of preventing the passage of heat through the body portions of the blocks 26, while leaving the joints between these blocks free for cooling, as hereinafter to be set forth.

I have shown in the accompanying drawing two ways in which cooling may be applied to the joints between the blocks of the weir, it being understood that either or both of these ways could be used at all the joints, or that some combination, such as that shown in the accompanying drawing, may be used if desired.

One manner of cooling the joints is that shown in the accompanying drawing for the transversely extending joints 28. For this purpose, I have illustrated chambers 30 for a gaseous cooling medium, such as air, which are located in the cavity formed by the blocks 26 at each of the transverse joints 28. These chambers may be formed as shown of sheet metal or other suitable material and are preferably similar in shape to, but somewhat smaller than the cavities in which they are located. Means such as pipes 31 are provided for supplying a cooling medium as air to the chambers 30. These chambers are provided around the necessary part of their peripheries with a series of jet openings 32 to blow the cooling medium onto the associated joints 28 in the plane of such joints and for substantially the entire lengths thereof on the side of the glass-contact blocks 26 opposite that side which is in contact with the molten glass. This will prevent or at least greatly minimize the penetration of glass into the joints between the blocks by freezing such glass as penetrates the joints and hence prevents further seepage of molten glass thereinto.

The air directed onto the several transverse joints 28 through the jet openings 32 from the chambers 30 as aforesaid may be discharged in one or the other of two ways. First, it may pass out through the openings 33 through which the chambers 30 are inserted into the positions in which they are shown, and, second, the air may pass along the free space 34 above the blocks 29 and past some of the chambers 30 to the ends of the space 34, which are open to the atmosphere at the opposite ends of the weir, at the sides of the tank.

Another means of cooling the joints is shown for the longitudinally extending joint 27. In this case the blocks 26 forming this joint are recessed, as shown, and in the recesses thus formed is disposed a pipe 35 through which a cooling fluid such as water may be passed from some suitable source and to some suitable discharge point. The result in this case will be substantially the same as where a gaseous medium is used for cooling and comprises the freezing of any glass which might tend to penetrate the joint.

From the foregoing, it will be seen I have provided a weir construction in association with a tank construction in which all the joints between the blocks forming the weir and between these blocks and the blocks forming the tank, which are in contact with molten glass, will be disposed in vertical planes, so as to minimize the corrosion of the blocks at these joints.

I have also provided the maximum practicable insulation of a weir construction as shown by insulating the body portions of the blocks intermediate the several joints therebetween.

I have also provided means by which the several joints may be locally cooled, thus preventing or minimizing any penetration of glass into the joints of the construction shown and hence making for the maximum life of the construction.

It will be understood that various changes may be made in the construction herein disclosed and certain features of the present disclosure may be advantageously employed without other features. I do not wish to be limited, therefore, except by the scope of the appended claims, which are to be construed as broadly as the state of the prior art permits.

I claim:

1. A weir adapted to be submerged in molten glass in a glass making tank, comprising a plurality of blocks of refractory material meeting in a plurality of joints all of which lie in vertical planes, and means individual to each of said joints for blowing a gaseous cooling medium locally onto said joints respectively in the planes thereof and for substantially the entire lengths of said joints to freeze any glass penetrating the joints between the blocks.

2. A weir adapted to be submerged in molten glass in a glass making tank, comprising a plurality of blocks of refractory material meeting in a plurality of joints which lie in vertical planes extending transversely of the longitudinal dimension of the weir, said blocks being so formed and arranged as to provide a cavity therebeneath as assembled, a chamber for a gaseous cooling medium arranged in said cavity at each of said joints and substantially similar in external shape to the internal shape of said cavity considered in the plane of said joints, means for conducting cooling medium to each of said chambers, and a series of jet openings in each of said chambers located in the plane of the respectively associated joint and extending substantially the entire length thereof for directing the cooling medium thereon to freeze any glass penetrating the joints between the blocks.

3. A weir adapted to be submerged in molten glass in a glass making tank, comprising a plurality of blocks of refractory material arranged together in contiguous relation to form the weir with sloping sides and a cavity therebeneath, said blocks meeting in a plurality of joints which are disposed in parallel vertical planes extending transversely of the weir, refractory material partially filling said cavity intermediate said joints, a chamber for a gaseous cooling medium in said cavity at each of said joints, said chambers being substantially similar in shape to the cross section of said cavity but spaced from the walls thereof, means for conducting cooling medium to each of said chambers, a series of jet openings in each of said chambers located in the plane of the respectively associated joint and extending substantially the entire length thereof for directing the cooling medium thereon to freeze any glass penetrating the joints, and outlets for the cooling medium from said cavity around and adjacent to each of said chambers and from the opposite ends of the cavity adjacent to the ends of the weir.

4. A weir adapted to be submerged in molten glass in a glass making tank, comprising contiguous blocks of refractory material meeting at a joint, and a pipe for a cooling fluid extending along said joint for substantially its entire length on the side of said blocks opposite that which is in contact with the molten glass to freeze any glass penetrating the joint between the blocks.

5. A weir adapted to be submerged in molten glass in a glass making tank, comprising contiguous blocks of refractory material meeting at a joint, the edges of said blocks along said joint on the side of the blocks out of contact with the molten glass being recessed for substantially the entire length of the joint on said side, and a pipe for a cooling fluid disposed in said recesses and extending substantially the entire length of said joint to freeze any glass penetrating the joint.

6. A weir adapted to be submerged in molten glass in a glass making tank, comprising a plurality of blocks of refractory material arranged to meet in a plurality of parallel transverse joints disposed in vertical planes and a longitudinal joint in a vertical plane, means individual to each of said transverse joints for blowing a gaseous cooling medium locally thereon in the respective planes of such joints and for substantially the entire lengths thereof, and a pipe for cooling fluid extending along said longitudinal joint for substantially its entire length, whereby to freeze any glass penetrating any of said joints.

7. A weir adapted to be submerged in molten glass in a glass making tank, comprising a plurality of side blocks of refractory material for each side of the weir, said blocks meeting at joints which are disposed in transverse vertical planes with the joints on one side respectively opposite those on the other side, and the side blocks of one side of the weir meeting those of the other side in a longitudinal joint disposed in a vertical plane, a chamber for gaseous cooling medium individual to each of said transverse joints and located in the cavity formed by said blocks beneath the weir, means for conducting a gaseous cooling medium to each of said chambers, a series of jet openings in each of said chambers located in the plane of the respectively associated transverse joint and extending substantially the entire length thereof for directing the cooling medium onto such joints, a pipe for cooling fluid extending along said longitudinal joint for substantially the entire length thereof, whereby to freeze any glass penetrating any of said joints, and refractory material at least partially filling the cavity between said transverse joints to insulate the body portions of the blocks forming the weir and to constrain the gaseous cooling medium to flow in paths adajacent to said joints.

8. A glass making tank, comprising side walls and a bottom wall forming a glass containing basin in which glass making materials are adapted to be melted and refined, a weir adapted to be submerged in molten glass and extending transversely of said basin between the side walls thereof, said weir being composed of a plurality of blocks of refractory material on either side, the blocks forming said weir being so formed, constructed and arranged as to be contiguous to one another and to the blocks forming the bottom of the glass containing basin on each side of the weir at joints, all of which are disposed in substantially vertical planes.

9. A glass making tank, comprising side walls and a bottom wall forming a glass containing basin in which glass making materials are adapted to be melted and refined, said walls being constructed of blocks of refractory material, a weir adapted to be submerged in molten glass and extending transversely of the basin thus formed between the side walls thereof, said weir being composed of blocks of refractory material each extending from below the level of the bottom of the tank up to the top of the weir, the blocks on one side of the weir being contiguous to those of the other side at the top of the weir in a joint disposed in a vertical plane and extending longitudinally of the weir and the blocks forming the weir meeting the blocks forming the bottom of the tank in joints disposed in vertical planes and extending longitudinally of the weir and parallel with the joint at the top thereof.

10. A glass making tank, comprising side walls and a bottom wall forming a glass containing basin in which glass making materials are adapted to be melted and refined, said side and bottom walls being built with the glass contacting surfaces thereof made up of blocks of refractory material, a weir extending transversely of the basin thus formed between the side walls thereof and adapted during the normal operation of the tank to be completely submerged in the glass therein, said weir being formed of a plurality of blocks of refractory material on each side thereof which extend from a level below that of the upper surfaces of the blocks forming the bottom of the tank to the top of the weir, the blocks forming the weir having sloping glass-contacting faces and meeting one another in joints arranged in vertical planes transverse of the weir on each side thereof and also in a joint disposed in a vertical plane extending longitudinally of the weir at the top thereof, the blocks forming the weir being contiguous with the blocks forming the bottom of the tank in joints arranged in substantially parallel vertical planes extending longitudinally of the weir, whereby there are no horizontal joints in the weir into which glass may penetrate to cause rapid erosion of the blocks of which the weir is composed.

11. A glass melting tank, comprising side walls and a bottom wall forming a glass containing basin in which glass making materials are adapted to be melted and refined, said side and bottom walls being built with the glass contact surfaces thereof made up of blocks of refractory material, a weir adapted to be submerged in molten glass and extending transversely of said basin between the side walls thereof, said weir being composed of a plurality of blocks of refractory material on either side to form a hollow weir, the blocks forming said weir being so formed, constructed and arranged as to be contiguous to one another and to the blocks forming the bottom of the glass containing basin on each side of the weir at joints, all of which are disposed in substantially vertical planes, and refractory material partially filling the cavity within said weir intermediate the joints between the blocks of which it is formed and arranged to leave spaces between such refractory material at the joints between the blocks of which the weir is formed, whereby such blocks will be cooler adjacent to their joints than at other portions thereof.

12. A glass making tank, comprising side walls and a bottom wall forming a glass containing basin in which glass making materials are adapted to be melted and refined, a weir adapted to be submerged in molten glass in said basin and extening between the side walls thereof, said weir being composed of a plurality of blocks of refractory material, the blocks forming said weir being so formed, constructed and arranged in respect to each other and to the blocks forming contiguous portions of the tank that all the joints between contiguous blocks are disposed in planes at substantial angles to the horizontal.

VERGIL MULHOLLAND.